G. STREMBERGER.
ANIMAL TRAP.
APPLICATION FILED APR. 4, 1916.
1,210,114.
Patented Dec. 26, 1916.
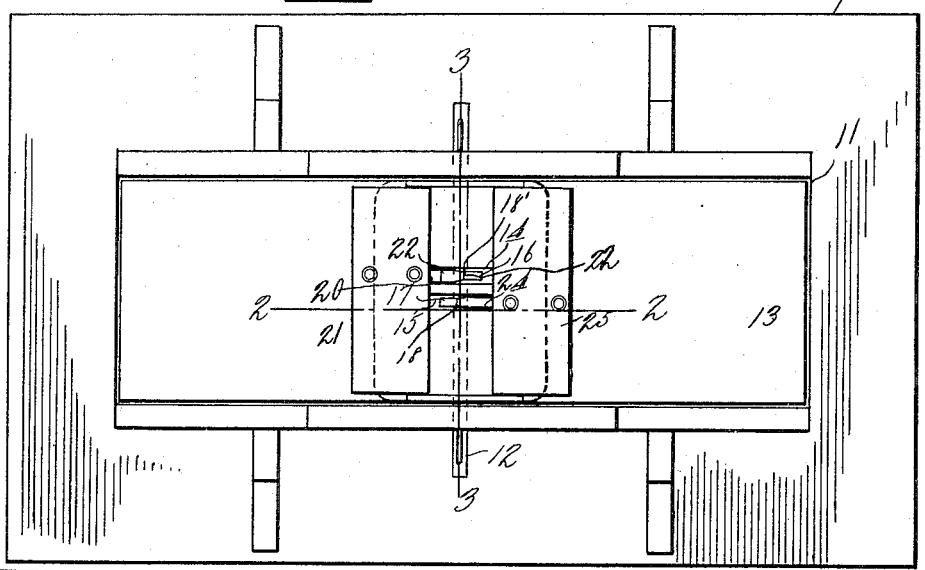
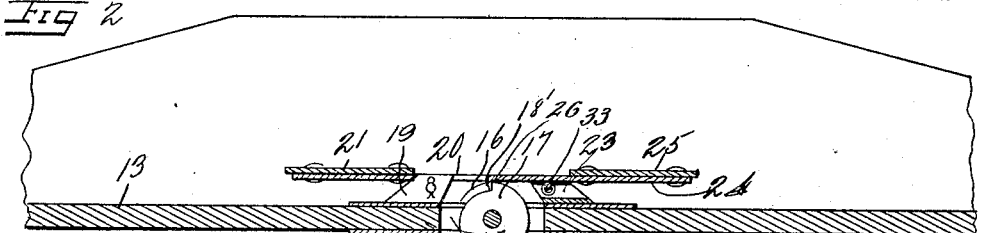
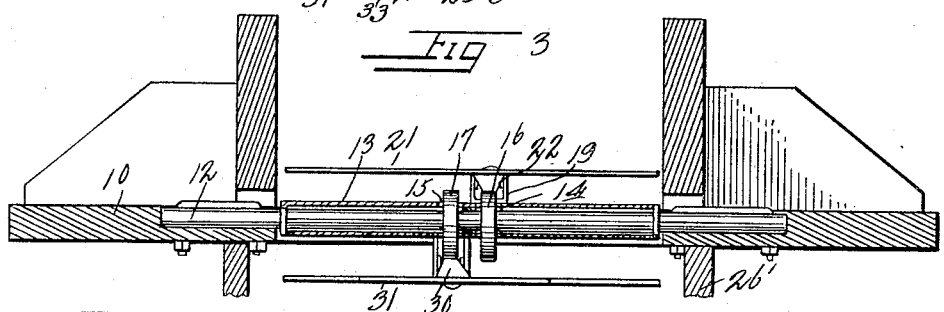
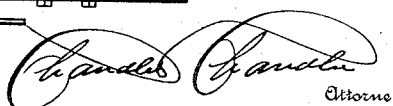
Inventor
G. Stremberger

UNITED STATES PATENT OFFICE.

GEORGE STREMBERGER, OF BUTTE, MONTANA.

ANIMAL-TRAP.

1,210,114.     Specification of Letters Patent.     Patented Dec. 26, 1916.

Application filed April 4, 1916. Serial No. 88,877.

*To all whom it may concern:*

Be it known that I, GEORGE STREMBERGER, a citizen of the United States, residing at Butte, in the county of Silverbow, State of Montana, have invented certain new and useful Improvements in Animal-Traps; and I do hereby declare the following to be a full, clear, and exact description of the invention, such as will enable others skilled in the art to which it appertains to make and use the same.

This invention relates to improvements in animal traps and particularly to traps for catching rats.

One object of the invention is to provide an efficient device of this character which will be automatically tripped by the weight of a rat so as to precipitate the animal into a receptacle containing water, and which will automatically reset itself for the next animal.

Another object is to provide a device of this character which will operate from either end to accomplish the desired result.

Other objects and advantages will be apparent from the following description when taken in connection with the accompanying drawing.

In the drawing: Figure 1 is a top plan view of my improved trap; Fig. 2 is a longitudinal sectional view on the line 2—2 of Fig. 1; Fig. 3 is a transverse section on the line 3—3 of Fig. 1; Fig. 4 is an end view.

Referring particularly to the accompanying drawing, 10 represents a base in which is formed the elongated opening 11. Extending transversely across the center of this opening, and rigidly secured against rotation in the base at the opposite side of the opening, is a shaft 12, and mounted for rotation on this shaft, and movable within the opening 11 is an elongated platform 13, the same fitting within the opening. In the center of the platform there are formed two elongated openings 14 and 15, and rigidly secured to the shaft and disposed within these openings are the disks 16 and 17. The disk 16 is formed with a shoulder 18 facing in one direction, while the disk 17 has a similar shoulder 18' facing in the other direction. Mounted adjacent one end of the opening 14 are the vertical parallel ears 19 between which is pivoted a lever 20 having on the outer end a pan 21, and on the inner end a downwardly extending projection or hook 22 for engagement with the shoulder 18. Mounted adjacent the opposite end of the other opening 15 are similar ears 23 between which there is pivoted a lever 24, the outer end of this lever being provided with a pan 25 and the inner end with a projection or hook 26 for engagement with the shoulder 19. When these hook members are engaged with the shoulders, rotatable movement of the platform 13 is prevented, by reason of the fact that the shafts and the disks are stationary, but when an animal steps onto the platform and presses down one of the pans 21 or 25, the platform will be tilted so as to precipitate the animal into the receptacle 26' arranged therebelow and into the water in the receptacle. By arranging the shoulders of the disks in opposite directions, the platform can be tipped when an animal enters from either end. On the opposite face of the platform there are arranged the pivoted arms 27 and 28 arranged at opposite ends of the openings 14 and 15 and provided with hook members 29 and 30 respectively for engagement with the shoulders of the disks. The outer ends of the arms are provided respectively with the pans 31 and 32. In order to hold the arms normally parallel to the member 13 these arms are provided with springs 33 as shown in Figs. 2 and 4.

In the operation of the device, when one of the pans is depressed so as to release its hook from the disk, the platform 13 will swing on the shaft so as to turn completely over and present its other side uppermost so that the hooks of the other arms will engage with the shoulders of the disks and hold the platform against depression. The platform will not tip when an animal steps thereon until one of the pans has been depressed.

What is claimed is:

An animal trap comprising a base board adapted to be placed on a receptacle, and having an elongated opening formed therein, vertical parallel guard walls disposed at the sides of the opening, a rigidly mounted shaft extending transversely across the center of the opening, a revoluble platform mounted on the shaft and movable through the openings, ratchet disks on the shaft having oppositely directed teeth, tilting arms pivoted to the platform on opposite sides of the shaft, and hook members on the arms engaging respective disks.

In testimony whereof, I affix my signature, in the presence of two witnesses.

GEORGE STREMBERGER.

Witnesses:
WILLIAM McCARTHY,
MIKE LAVELLS.

Copies of this patent may be obtained for five cents each, by addressing the "Commissioner of Patents, Washington, D. C."